(12) United States Patent
Ziegler

(10) Patent No.: US 6,925,535 B2
(45) Date of Patent: Aug. 2, 2005

(54) PROGRAM CONTROL FLOW CONDITIONED ON PRESENCE OF REQUESTED DATA IN CACHE MEMORY

(75) Inventor: Michael L. Ziegler, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 09/942,154

(22) Filed: Aug. 29, 2001

(65) Prior Publication Data

US 2003/0046494 A1 Mar. 6, 2003

(51) Int. Cl.[7] .............................................. G06F 12/00
(52) U.S. Cl. ...................... 711/138; 711/137; 712/225; 712/234
(58) Field of Search ................................ 711/137, 138, 711/146, 154; 712/225, 234, 245, 2

(56) References Cited

U.S. PATENT DOCUMENTS

| | | | | |
|---|---|---|---|---|
| 5,594,884 A | * | 1/1997 | Matoba et al. ............... | 711/125 |
| 5,701,435 A | * | 12/1997 | Chi ............................ | 711/159 |
| 5,721,854 A | * | 2/1998 | Ebcioglu et al. ............. | 712/203 |
| 6,061,710 A | * | 5/2000 | Eickemeyer et al. ......... | 718/107 |
| 6,157,988 A | * | 12/2000 | Dowling ..................... | 711/140 |
| 6,594,755 B1 | * | 7/2003 | Nuechterlein et al. ....... | 712/239 |
| 6,665,767 B1 | * | 12/2003 | Comisky et al. .............. | 711/3 |
| 2001/0054137 A1 | * | 12/2001 | Eickemeyer et al. .......... | 712/11 |
| 2002/0144060 A1 | * | 10/2002 | Stoodley ...................... | 711/118 |
| 2002/0172320 A1 | * | 11/2002 | Chapple ....................... | 377/44 |

OTHER PUBLICATIONS

Fetch Directed Instruction Prefetching, Glenn Reinman et al., IEEE, 1999.*
Informing Memory Operations: Provifing Memory Performance Feedback on Mordern Processors, Horowitz et al. Proceedings of the 23rd Annual International Symposium on Computer Architecture, May, 1996.*

* cited by examiner

Primary Examiner—Matthew Kim
Assistant Examiner—Woo H. Choi

(57) ABSTRACT

Method and apparatus for conditioning program control flow on the presence of requested data in a cache memory. In a data processing system that includes a cache memory and a system memory coupled to a processor, in various embodiments program control flow is conditionally changed based on whether the data referenced in an instruction are present in the cache memory. When an instruction that includes a data reference and an alternate control path is executed, the control flow of the program is changed in accordance with the alternate control path if the referenced data are not present in the cache memory. The alternate control path is either explicitly specified or implicit in the instruction.

9 Claims, 4 Drawing Sheets

PROGRAM CONTROL FLOW CONDITIONED ON PRESENCE OF REQUESTED DATA IN CACHE MEMORY

FIELD OF THE INVENTION

The present invention generally relates to computer systems having cache memories, and more particularly to optimizing program performance in the event of a cache miss.

BACKGROUND

Caches were invented for computer systems to address the problems associated with slow memory access relative to processor speed. Without a cache, the processor must wait for instructions or operands ("data") from memory in order to proceed with program execution. The time a processor spends waiting essentially wastes processor capacity. With a cache, the long memory access times are eliminated when the requested data are present in the cache.

While memory speeds have improved substantially, the increase in processor speeds has been far greater. The increase in memory speed means that a processor will wait less (real time) for data to be retrieved from memory. However, the increased processor speed means the processor must wait a greater number of processor cycles in reading the data from memory. Thus, even though a processor may spend less real time waiting for data, the processor may be spending a greater number of cycles waiting relative to prior generations of processors. While processor speeds have improved, the processors may be spending a greater percentage of time waiting and therefore wasting a greater percentage of processing capacity.

While increased cache sizes reduce the number of times that a process is forced to wait for data from memory, the increased size alone is not enough to make up for the growing difference in speeds between memories and processors.

A method and apparatus that address the aforementioned problems, as well as other related problems, are therefore desirable.

SUMMARY OF THE INVENTION

The invention provides method and apparatus for conditioning program control flow on the presence of requested data in a cache memory. In a data processing system that includes a cache memory and a system memory coupled to a processor, in various embodiments program control flow is conditionally changed based on whether the data referenced in an instruction are present in the cache memory. When an instruction that includes a data reference and an alternate control path is executed, the control flow of the program is changed in accordance with the alternate control path if the referenced data are not present in the cache memory. The alternate control path is either explicitly specified or implicit in the instruction. In another embodiment, the requested data are not returned to the processor in the event of a cache miss. In yet another embodiment, a probe-cache instruction is used to check for specified data in the cache memory without loading the data into the processor. If the data specified in a probe-cache instruction are not present in the cache memory, the program flow is changed as specified by the instruction.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention conditionally alters program flow in the event of a cache-miss condition. This allows the program to schedule an alternative control flow to reduce the performance-degrading effects of memory latency. The invention is useful in a number of scenarios. In one scenario, program control is transferred to an instruction that does not depend on the requested data, and the requested data are read from memory into cache and provided to the processor while one or more other instructions are executed. In another scenario, program control is transferred on a cache-miss condition, and the requested data are returned to the cache but not to the processor. In yet another scenario, a probe-cache instruction is executed to determine whether specified data are present in the cache. If the specified data are present, program execution continues with the next instruction. Otherwise, control is transferred to a specified target address.

Figure 1:
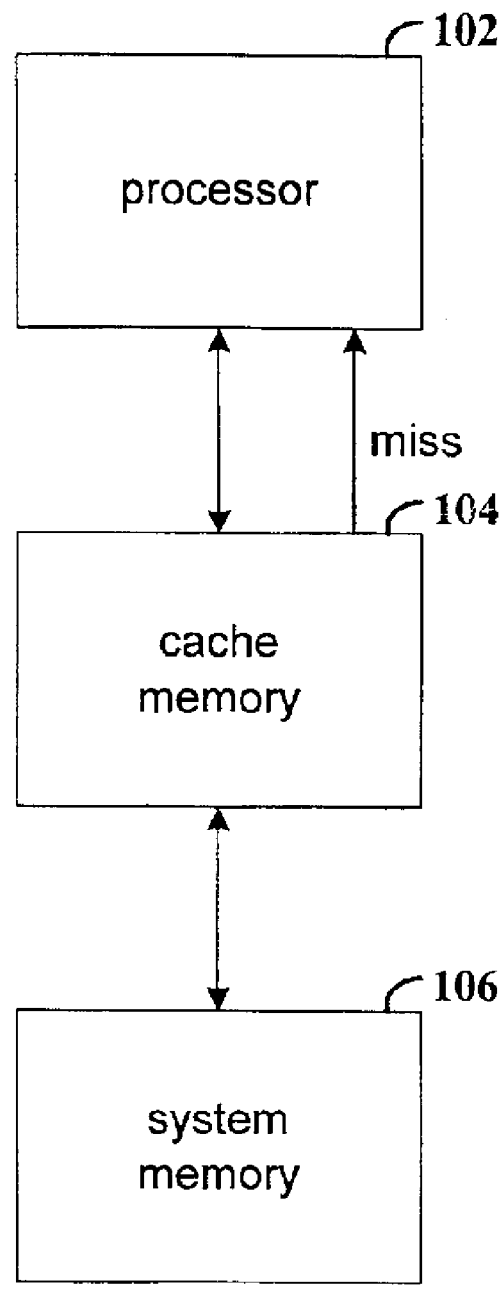
FIG. 1 is a functional block diagram of an example computing arrangement.

FIG. 1 is a functional block diagram of an example computing arrangement. The computing arrangement includes processor 102, cache memory 104, and system memory 106. In various embodiments, the invention is suitable for use with any of a variety of computing architectures. Generally, processor 102 executes instructions and manipulates data that are stored in system memory 106. Cache memory 104 provides temporary storage of instructions and data that are requested by the processor. While many modern processors have an on-board first-level cache, for the purposes of this discussion, cache memory 104 refers in function to all the levels of cache in a computing arrangement.

When an instruction executing on processor 102 references data (either a read or write request) from cache memory 104, the cache memory determines whether the referenced data are present. If the data are not present, the cache memory signals a cache-miss condition to the processor. The signaling of a cache-miss condition, in some designs, causes the CPU to stall until the referenced data are brought into cache memory (for a read request). In "stall-on-use" designs, the cache-miss condition is used to stall only the loading of the register file with the referenced data, and a more global stall of the CPU occurs only if an attempt is made to access the referenced data before the data are returned to the register file. In both cases, an indication that the data are not present in the cache memory is provided to the processor's control logic.

In the present invention, the special instructions executed by the processor cause a conditional skip or branch in response to a cache-miss condition. By permitting an alternate control flow in the event of a cache-miss condition, the computation cycles of the processor may be used while the referenced data are retrieved from system memory.

It will be appreciated that there are numerous options for implementing instructions that alter control flow on a cache-miss condition. For example, in a "skip on cache-miss" load instruction, the encoding need only differ from a normal load instruction by a single bit in the operation code. There may be a variety of load instructions in a typical instruction set (for different data lengths, manipulation of index registers as a side effect, different destination register files, etc.). Any or all of the different load instructions may have a skip option. In another embodiment, the program control flow is changed by branching. It will be appreciated that there are generally two types of branches. A simple branch transfers control to a target location and does not return control to the branch point. A branch to a subroutine involves a transfer of control to a target location and a provision for subsequent return of control to the branch point.

Figure 2:
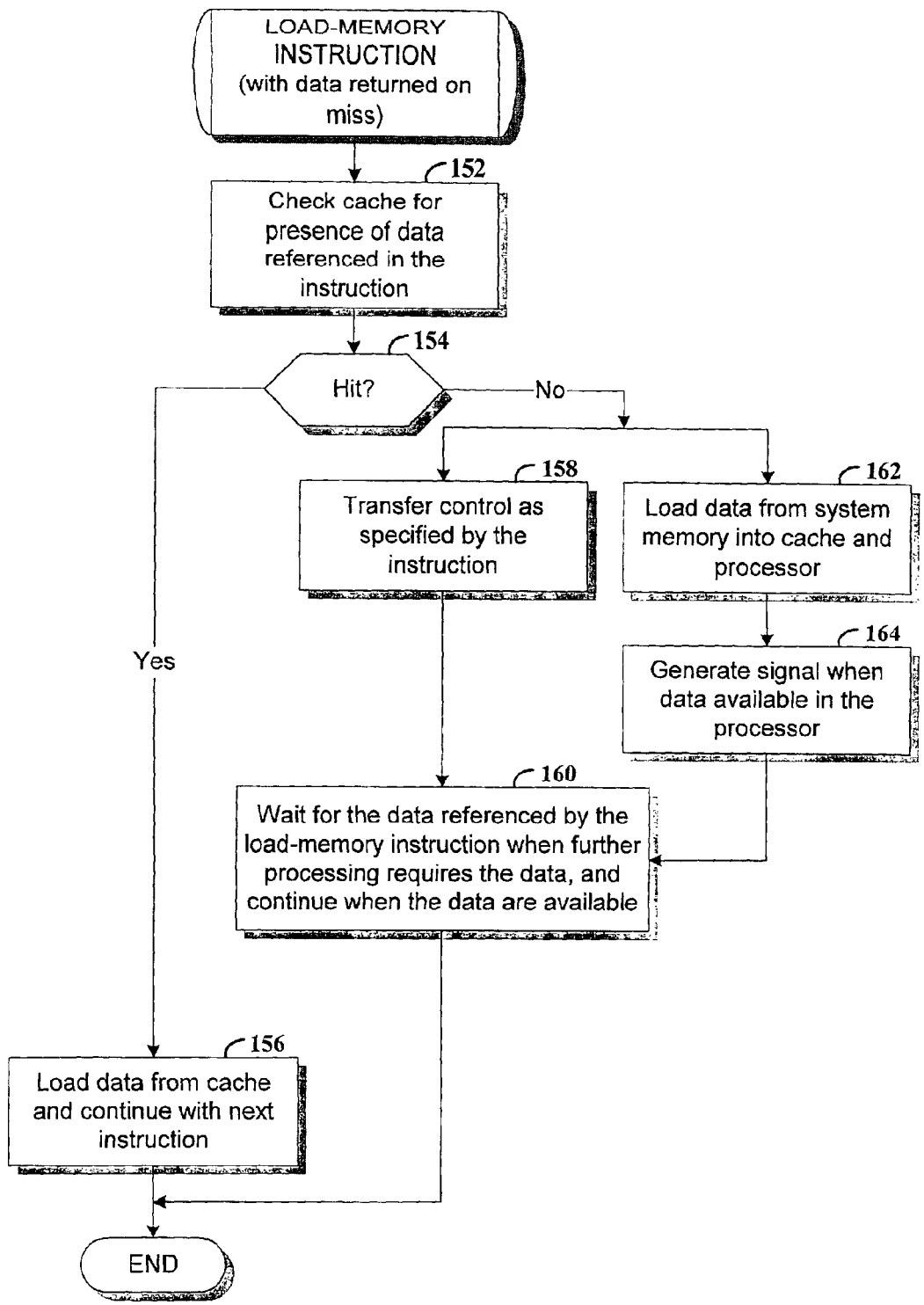
FIG. 2 is a flowchart of a process performed for a load-memory instruction where control flow is changed and data are returned to the processor on a cache miss in accordance with one embodiment of the invention.

FIG. 2 is a flowchart of a process followed in execution of an example load-memory instruction, with control flow depending on a cache-miss condition and the referenced data being returned to the cache memory and to the processor. At step 152, the load instruction causes the cache memory to be checked for the referenced data. If the data are present, decision step 154 directs the process to step 156 where program execution continues with loading of the requested data and execution of the instruction that follows the load instruction. It will be appreciated that in a stall-on-use design the loading of the data from the cache and the continued execution of instructions may proceed in parallel, provided that the instructions executed do not depend upon the data being returned.

If the referenced data are not present in the cache memory, decision step 154 directs the process to steps 158 and 162, which proceed in parallel. At step 158, control is transferred to the instruction specified by the load instruction, and while the program execution continues in the alternate control path, the referenced data are loaded from the system memory into the cache memory. When the program can execute no further because of dependencies on the referenced data, at step 160 the process waits for the referenced data to be returned to the processor from the cache memory. At step 164, a signal is generated and provided to the processor when the data are available. If the load-memory resulted from a skip or simple branch instruction, execution may or may not return to the branch point, depending on the program logic. If, on the other hand, the load-memory instruction resulted from a branch to a subroutine, then control would be returned to the branch point upon execution of a subsequent "return from subroutine" instruction.

Figure 3:
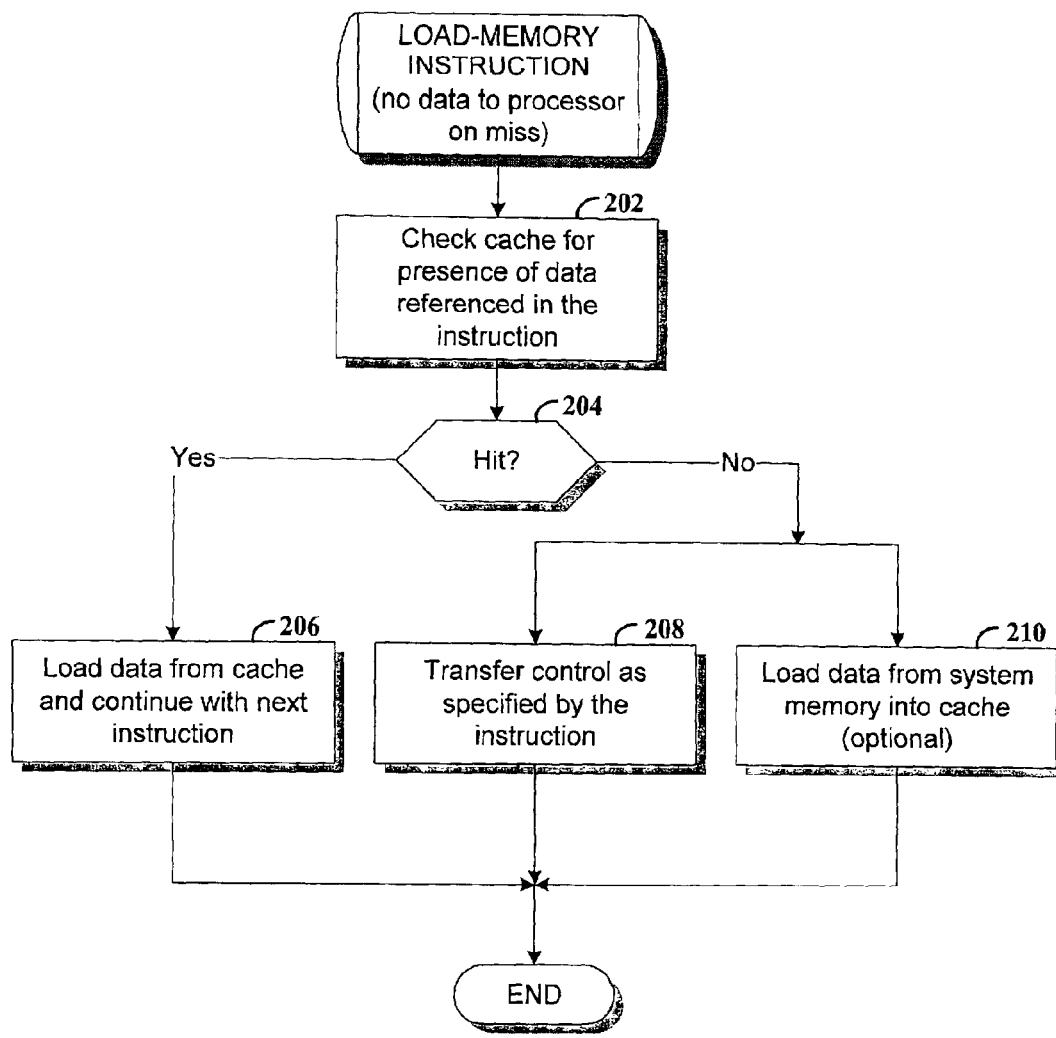
FIG. 3 is a flowchart of a process performed for a load-memory instruction where control flow is changed and no data are returned to the processor on a cache miss in accordance with another embodiment of the invention.

FIG. 3 is a flowchart of a process followed in execution of an example load-memory instruction, with control flow depending on a cache-miss condition and the referenced data not being returned to the processor on a cache miss. At step 202, the load instruction causes the cache memory to be checked for the referenced data. If the data are present, decision step 204 directs the process to step 206 where program execution continues with loading of the requested data and execution of the instruction that follows the load instruction. It will be appreciated that in a stall-on-use design the loading of the data from the cache and the continued execution of instructions may proceed in parallel, provided that the instructions executed do not depend upon the data being returned.

If the referenced data are not present in the cache memory, decision step 204 directs the process to steps 208 and 210, which proceed in parallel. At step 208, control is transferred to the instruction specified by the load instruction, and while program execution continues in the alternate control path, the referenced data are loaded from the system memory into the cache memory (step 210). If the load-memory resulted from a skip or simple branch instruction, execution may or may not return to the branch point, depending on the program logic. If, on the other hand, the load-memory instruction resulted from a branch to a subroutine, then control would be returned to the branch point upon execution of a subsequent "return from subroutine" instruction. In another embodiment, the data are not loaded into the cache memory in the event of a cache miss.

Figure 4:
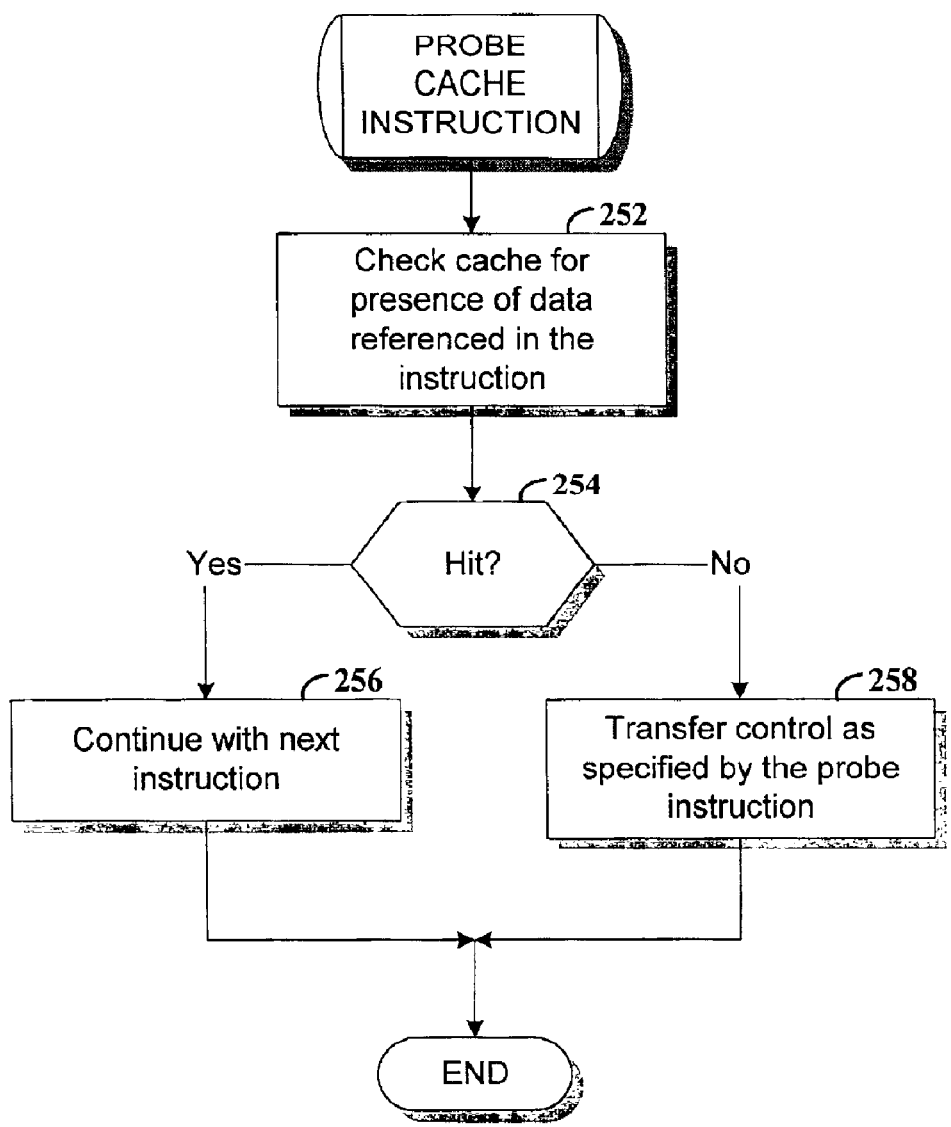
FIG. 4 is a flowchart of an example process performed for a probe-cache instruction.

FIG. 4 is a flowchart of a process followed in execution of an example probe-cache instruction, with control flow depending on a cache-miss condition. The probe-cache instruction checks the cache for the specified data and conditionally changes program control flow based on a cache-miss condition without loading any data into the processor or cache memory. At step 252, the probe-cache instruction causes the cache memory to be checked for the referenced data. If the data are present, decision step 254 directs the process to step 256 where program execution continues with the instruction that follows the probe-cache instruction. If the referenced data are not in the cache memory, at step 258 program control is transferred to the target address specified by the probe-cache instruction. If the probe-cache instruction is in combination with a skip or simple branch instruction, execution may or may not return to the branch point, depending on the program logic. If, on the other hand, the probe-cache instruction is in combination with a branch to a subroutine, then control would be returned to the branch point upon execution of a subsequent "return from subroutine" instruction.

The present invention is believed to be applicable to a variety of computing architectures. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for executing instructions of a computer program, comprising:

in executing a probe-cache instruction, determining whether data referenced by the probe-cache instruction are present in a cache, without reading the data from the cache in response to the data being present in the cache and without loading the data from memory in response to the data not being present in the cache;

in response to the data being present in the cache, fetching and executing a first instruction that immediately follows the probe-cache instruction in the program code; and in response to the data not being present in the cache, fetching and executing a second instruction other than the first instruction.

2. The method of claim 1, wherein the second instruction is two instruction addresses after the probe-cache instruction.

3. The method of claim 1, wherein the probe-cache instruction includes a target address, and the second instruction is at the target address.

4. The method of claim 1, wherein the target address specified by the probe-cache instruction references an address of a sub-routine and further comprising returning control to an instruction immediately following the probe-cache instruction in response to completion of the subroutine.

5. An apparatus for executing instructions of a computer program, comprising:

means responsive to execution of a probe-cache instruction, for determining whether data referenced by the probe-cache instruction are present in a cache, without reading the data from the cache in response to the data being present in the cache and without loading the data from memory in response to the data not being present in the cache;

means responsive to the data being present in the cache, for fetching and executing a first instruction that immediately follows the probe-cache instruction in the program code; and means responsive to the data not being present in the cache, for fetching and executing a second instruction other than the first instruction.

6. A computing arrangement comprising:

a processor configured to execute a program;

a cache memory coupled to the processor;

a system memory coupled to the cache memory;

means coupled to the processor and responsive to execution of a probe-cache instruction by the processor, for determining whether data referenced by the probe-cache instruction are present in a cache, without reading the data from the cache in response to the data being present in the cache and without loading the data from memory in response to the data not being present in the cache;

means responsive to the data being present in the cache, for fetching and executing a first instruction that immediately follows the probe-cache instruction in the program code; and means responsive to the data not being present in the cache, for fetching and executing a second instruction other than the first instruction.

7. The arrangement of claim 6, wherein the second instruction is two instruction addresses after the probe-cache instruction.

8. The arrangement of claim 7, wherein the probe-cache instruction includes a target address, and the second instruction is at the target address.

9. The arrangement of claim 6, wherein the target address specified by the probe-cache instruction references an address of a sub-routine and further comprising means for returning control to an instruction immediately following the probe-cache instruction in response to completion of the subroutine.

* * * * *